United States Patent
Powell

(10) Patent No.: US 7,413,653 B2
(45) Date of Patent: Aug. 19, 2008

(54) PORTABLE FILTERED DRINKING WATER SYSTEM

(76) Inventor: James Dennis Powell, 6131 Port Tack Dr., Las Vegas, NV (US) 89110

( * ) Notice: Subject to any disclaimer, the term of this patent is extended or adjusted under 35 U.S.C. 154(b) by 404 days.

(21) Appl. No.: 11/209,243

(22) Filed: Aug. 23, 2005

(65) Prior Publication Data

US 2007/0045169 A1    Mar. 1, 2007

(51) Int. Cl.
B01D 29/56    (2006.01)
C02F 1/00    (2006.01)

(52) U.S. Cl. .................. 210/416.3; 210/232; 210/314; 210/460

(58) Field of Classification Search .............. 210/263, 210/314, 315, 416.1, 416.3, 459, 460, 916, 210/232
See application file for complete search history.

(56) References Cited

U.S. PATENT DOCUMENTS

| | | | | |
|---|---|---|---|---|
| 1,945,824 A | * | 2/1934 | Saxe | 210/460 |
| 2,670,081 A | * | 2/1954 | Quinn | 210/316 |
| 2,723,056 A | * | 11/1955 | Smith | 222/396 |
| 3,206,033 A | * | 9/1965 | Kern, Jr. | 210/249 |
| 3,836,050 A | * | 9/1974 | Dreibelbis | 222/66 |
| 4,606,477 A | * | 8/1986 | Spengler et al. | 222/153.09 |
| 4,636,307 A | * | 1/1987 | Inoue et al. | 210/188 |
| 4,990,254 A | * | 2/1991 | Toida et al. | 210/464 |
| 5,120,437 A | | 6/1992 | Williams | |
| 5,190,643 A | * | 3/1993 | Duncan et al. | 210/85 |
| 5,518,613 A | | 5/1996 | Koczur | |
| 5,569,374 A | | 10/1996 | Williams | |
| 5,900,143 A | | 5/1999 | Dalton et al. | |
| 6,068,163 A | * | 5/2000 | Kihm | 222/189.1 |
| 6,138,875 A | * | 10/2000 | Condon et al. | 222/402 |
| 6,248,244 B1 | * | 6/2001 | Dann | 210/764 |
| 6,344,146 B1 | | 2/2002 | Moorehead | |
| 6,367,663 B1 | * | 4/2002 | Condon et al. | 222/190 |
| 6,379,544 B1 | * | 4/2002 | Chen | 210/244 |
| 6,589,421 B1 | * | 7/2003 | Nova | 210/257.1 |
| 2004/0144711 A1 | | 7/2004 | Cluff | |

FOREIGN PATENT DOCUMENTS

JP    45-637    * 1/1970
JP    9-57248    * 3/1997

* cited by examiner

Primary Examiner—Fred G. Prince

(57) ABSTRACT

A portable filtered drinking water system for removing undesirable tastes, odors, and contaminants from potable water to improve the quality of the water for drinking or consumption. The device consists of a container that holds the potable water and has an air tight screw on cap. Mounted on the cap is an opening for a screw-in hand air pump to create air pressure inside the container and an opening for a faucet for dispensing filtered drinking water. Pulling up and pushing down several times on the hand air pump creates air pressure in the container that forces the potable water through a water filter located inside the container and up to a faucet to be dispensed when a lever is pushed down.

11 Claims, 5 Drawing Sheets

PORTABLE FILTERED DRINKING WATER SYSTEM

CROSS-REFERENCE TO RELATED APPLICATIONS

Not Applicable

FEDERLLY SPONSORED RESEARCH

Not Applicable

SEQUENCE LISTING OR PROGRAM

Not Applicable

BACKGROUND OF THE INVENTION

1. Field of Invention

This invention relates to providing a portable system that will have a container of approximately two to three gallons to be filled with potable water, use a hand air pump to put air pressure in the top of the container, use the air pressure to force the water through a drinking water filter located at the bottom of the container and through tubing up to a faucet with a lever that can be pushed to allow filtered drinking water to come out the spout of the faucet when needed.

2. Prior Art

Many companies offer filtered drinking water systems for home use. They are normally hooked into the water pipes to the faucet on the kitchen sink and have a special faucet to dispense water. They can also be hooked into the end of the kitchen sink faucet where the aerator is located. These systems rely on the water pressure in the water pipes to force water through the filter in the drinking water system. Most are capable of providing about 500 gallons of filtered drinking water over a period of about six months. This results in a low cost per gallon for filtered drinking water. These systems fulfill a need in providing filtered drinking water in the kitchen where it is needed.

However, often times large quantities of inexpensive filtered drinking water are needed outside the home. Examples are at picnics, camping, at work, and while a person is traveling or driving around town in their vehicle. Therefore, there has been a need for a system that is portable for providing inexpensive filtered drinking water. An alternative is to buy bottled drinking water at convenience stores. When filtered drinking water is bought in these bottles, it can become extremely expensive compared to the cost per gallon for the filtered drinking water that comes from a system for home use. Therefore, a portable system could be used away from the home to provide less expensive filtered drinking water than buying it from convenience stores.

There are several portable water filtration/purification devices/apparatuses that have been invented. However these systems concentrate on converting contaminated water into potable water. They are not made for the purpose of providing a portable system for improving the taste and appearance and removing odor and contaminants from potable water with a capacity to produce several hundred gallons of filtered drinking water like the systems for home use.

Existing systems often use a pump that pushes water through the water filter. They do not provide a constant pressure in the container to dispense water from a faucet as needed. You would have to pull out on the pump to draw water into a cylinder and then push the pump to force water through the water filter and out a spout each time a drink is needed.

These systems do not have a pressurized container that could dispense water as needed from a faucet like a home system.

These systems that convert contaminated water into potable water are small canteen-sized devices that appear to have a camping, survival or military use. They are not pressurized systems that can produce water by simply pushing a lever to have water come out a spout. They would not be practical to use for producing several hundred gallons of filtered drinking water. U.S. Pat. No. 6,344,146 to Moorehead et al (2002) is a canteen sized device that only produces a few pints of water at a time. U.S. Pat. No. 5,120,437 to Williams (1992) and U.S. Pat. No. 5,569,374 to Williams (1996) are for converting unpurified water and is small enough to be carried in a backpack or briefcase. Water has to be pumped each time water is needed and does not come from a pressurized system. Neither are practical to produce several hundred gallons of filtered drinking water.

Other portable systems have a drinking tube that depends on the suction from a person's mouth to draw water in the container through a water filter. This would be unsanitary if used by more than one person. They are small so they can be carried around or fit into a backpack thus are only good for supplying small amounts of water. They are made for camping, survival or military use. U.S. Pat. No. 5,518,613 to Koczur et al (1996) is designed to convert contaminated water into potable water, requires a chemical purification agent, depends on a drinking tube, is small and could only produce a small amount of drinking water. U.S. patent application 2004/0144711 Alto Cluff et al (2004) is to improve municipal water but depends on a drinking tube, is small and could only produce a small amount of drinking water.

Yet another portable container for purifying drinking water depends on an ozone generator to purify the water and the filter and an air pump for delivering ozone and air through the container. It appears to require a battery of operate. Again this system is small and could only produce a small amount of water. This is U.S. Pat. No. 5,900,143 Dalton et al (1999).

BACKGROUND OF INVENTION—OBJECTS AND ADVANTAGES

Accordingly, besides the objects and advantages of the Portable Filtered Drinking Water System described in this invention, several objects and advantages of the invention are:

(a) to provide a portable system for supplying filtered drinking water wherever you go, i.e. to work, traveling, camping, picnics;

(b) to provide a system for producing filtered drinking water outside the home that will improve taste and appearance and remove odors and contaminants found in normal potable water;

(c) to provide a system that will supply inexpensive drinking water outside the home;

(d) to provide an alternative to purchasing expensive bottled drinking water from convenience stores;

(e) to provide a system that could produce a large volume of filtered drinking water i.e. several hundred gallons;

(f) to provide a system that makes it very easy to dispense filtered drinking water; and (g) to ultimately improve a person's health and hydration by having the convenience of readily available filtered drinking water while on-the-go.

SUMMARY

In accordance with this invention, no other system combines the simple components of a container, hand air pump, drinking water filter, and faucet to provide the objects and advantages of this invention.

The features of the present invention will be described from the following detailed description of the accompanying drawings.

DRAWINGS—FIGURES

Figure 1:
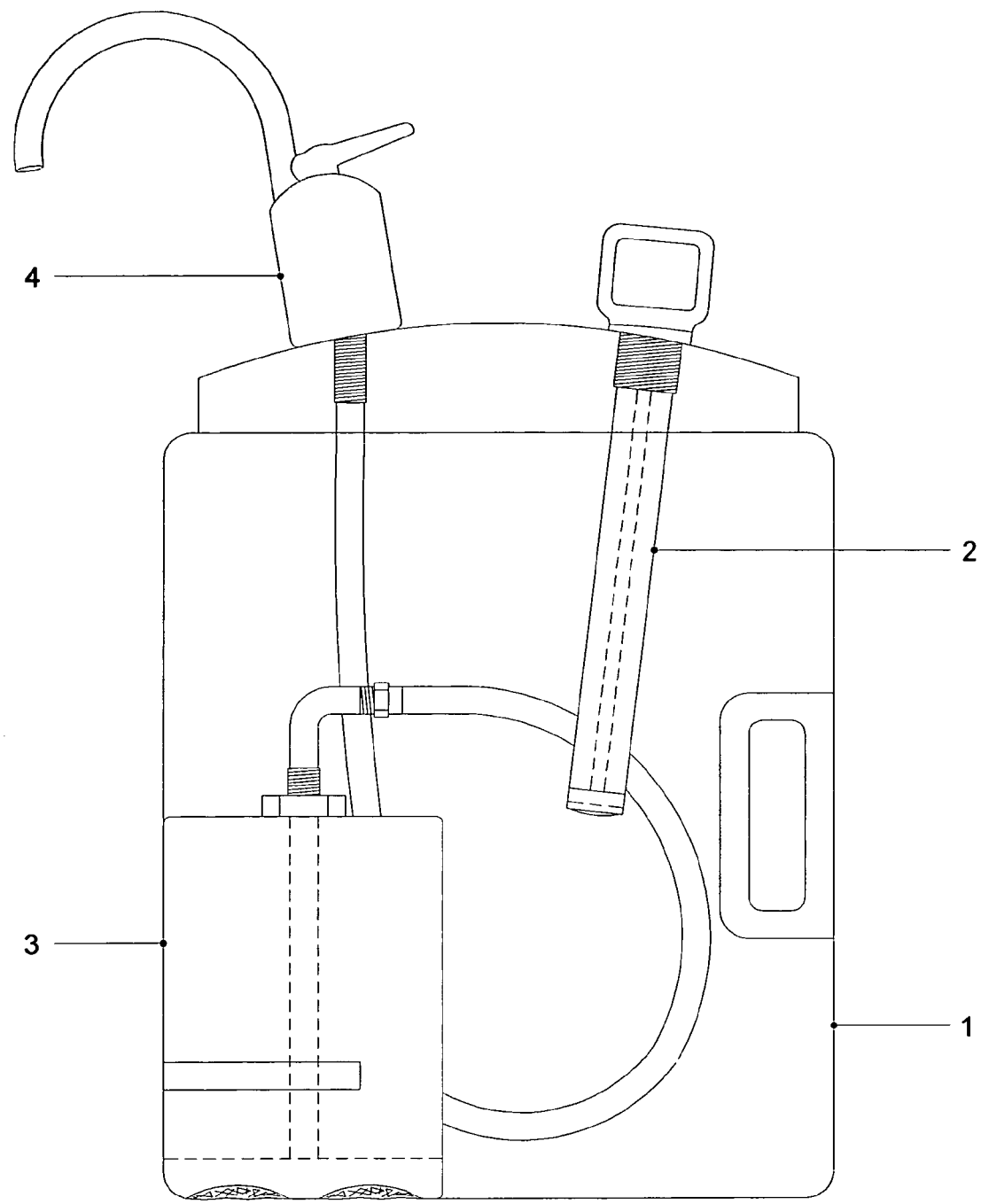
FIG. 1 shows a complete assembled unit.

DRAWINGS—REFERENCE NUMERALS 1 water container
2 hand air pump
3 water filter
4 faucet with lever
5 screw on lid
6 threads on water container
7 handle on water container
8 screw-in threads for hand air pump
9 reinforced opening for faucet
10 bracket inside water container to hold water filter
11 threads on hand air pump
12 flapper control to put air in water container
13 piston in hand air pump to put air
14 fitting in top of water filter pressure in water container
15 elbow in fitting
16 connection to tubing to faucet
17 tubing to faucet
18 cutouts on bottom of water filter
19 pre-filter material
20 filter material inside the water filter
21 spout for faucet
22 lever for faucet
23 washer to seal faucet to cap
24 washer to seal faucet to cap
25 nut to secure faucet to cap
26 threads on faucet for nut
27 tubing to faucet

DETAILED DESCRIPTION—FIGS. 1 THRU FIGS. 5

A preferred embodiment of the invention is illustrated in FIG. 1. It is a complete assembled unit. The container 1 would be made of clear plastic and hold the potable water. The top for the container would be a removable lid that would screw on to the bottom of the container and be air-tight. The top would have openings for a faucet 4 and a hand air pump 2. The water filter 3 would be located inside the container at the bottom and be held in place by a bracket. Potable water would be put in the container by unscrewing the hand air pump. This would leave an opening to put in water. The water would only fill about three fourths of the container. This would leave room on the top of the container to build up air pressure. The hand air pump would be screwed back in and pumped up four to eight times. This would create enough air pressure to fill a pitcher of filtered drinking water. The air pressure would force water through the bottom of the water filter, through the pre-filter material, through the filter material inside the water filter and through the tubing and up to the faucet. After the air was out of the filter and tubing, there would be a continuous flow of filtered drinking water by pushing the lever on the faucet. When the air pressure got low, the hand air pump could be pumped up again and again until more water needed to be added.

Operation

Figure 2:
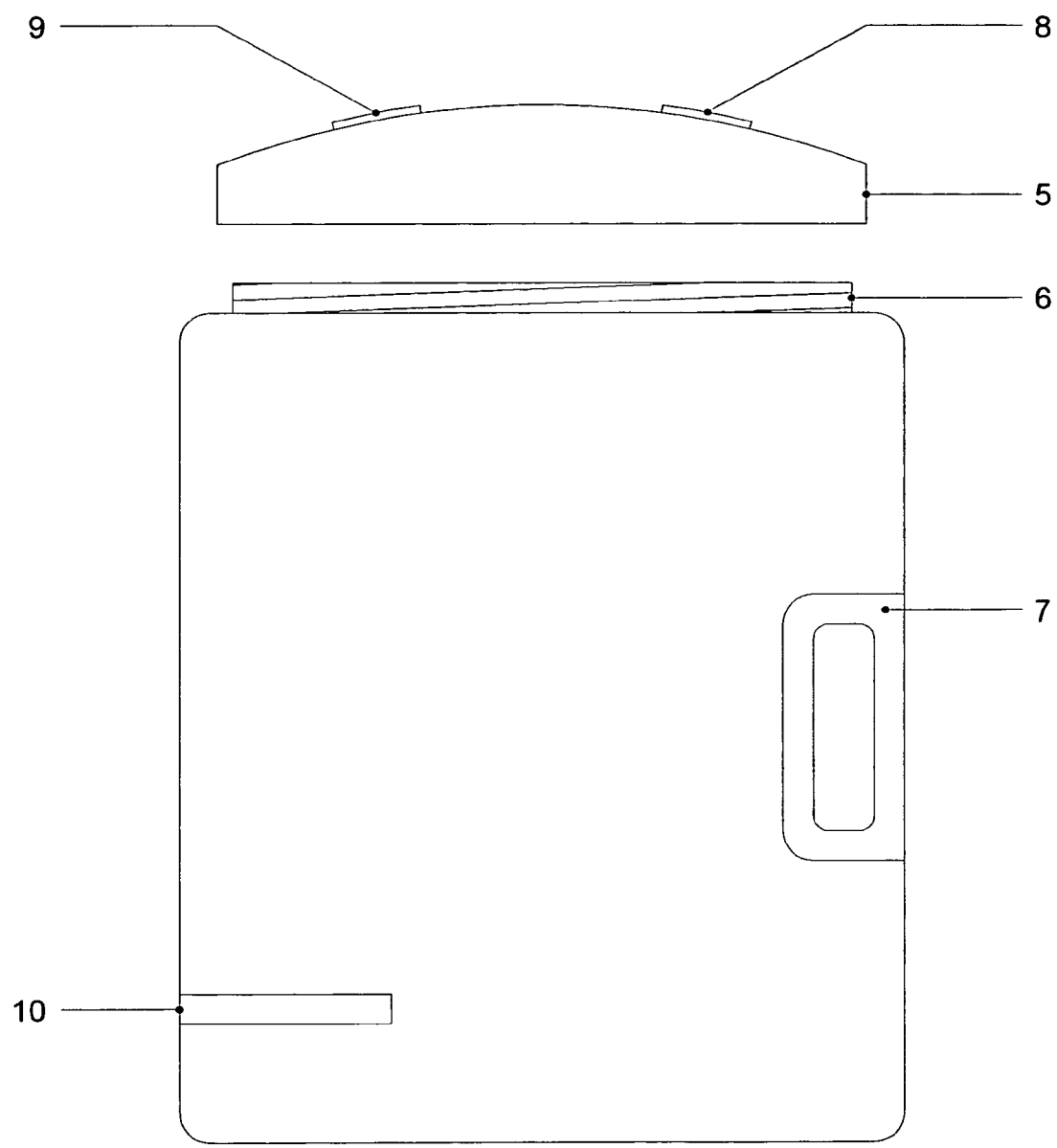
FIG. 2 shows a see through plastic container with a handle, a holding device for the water filter, and a removable screw top with openings for a faucet and a hand air pump.

FIG. 2 provides additional details on the container. The container would be made of clear plastic and be thick enough to hold air pressure without bulging. The container would have a handle 7 molded into the side to make carrying the container easier. Inside the container molded into the plastic would be a bracket 10 that would wrap about two-thirds of the way around the water filter to hold it in place. The bottom of the container would have threads 6 on top for a screw on cap 5. The cap would screw on to the bottom of the container and be air tight. It would have a gasket to seal the cap to the bottom. The cap would have an opening 8 for the hand air pump. This would be a threaded opening for the hand air pump to screw into. The hand air pump would screw in until it was air tight. The cap would also have a reinforced opening 9 for the faucet. The faucet would be mounted with gaskets on top and bottom and a nut to fasten it air tight to the cap.

Figure 3:
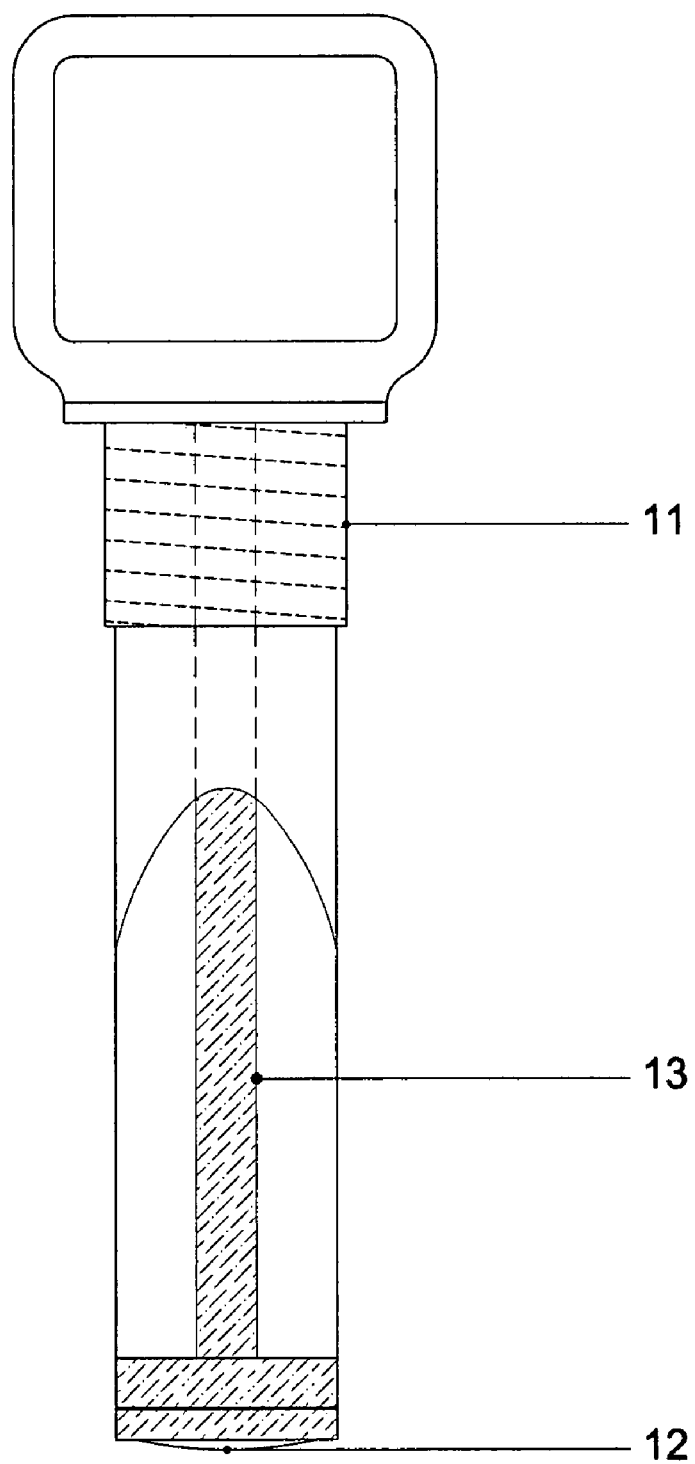
FIG. 3 shows a hand air pump.

FIG. 3 provides additional details on the hand air pump. This is a common hand air pump of the type found on sprayers. The handle is obvious. Under the handle would be threads 11 to screw into the cap. Inside the hand air pump would be a rod and piston with an O ring 13 that would be pulled up and pushed down to force air into the container. The flapper valve 12 would let air be pushed into the container when pushing down on the handle yet prevent water from being sucked back into the cylinder of the air hand pump when the handle is pulled back up. Air pressure is created inside the container by pulling and pushing the handle up and down several times.

Figure 4:
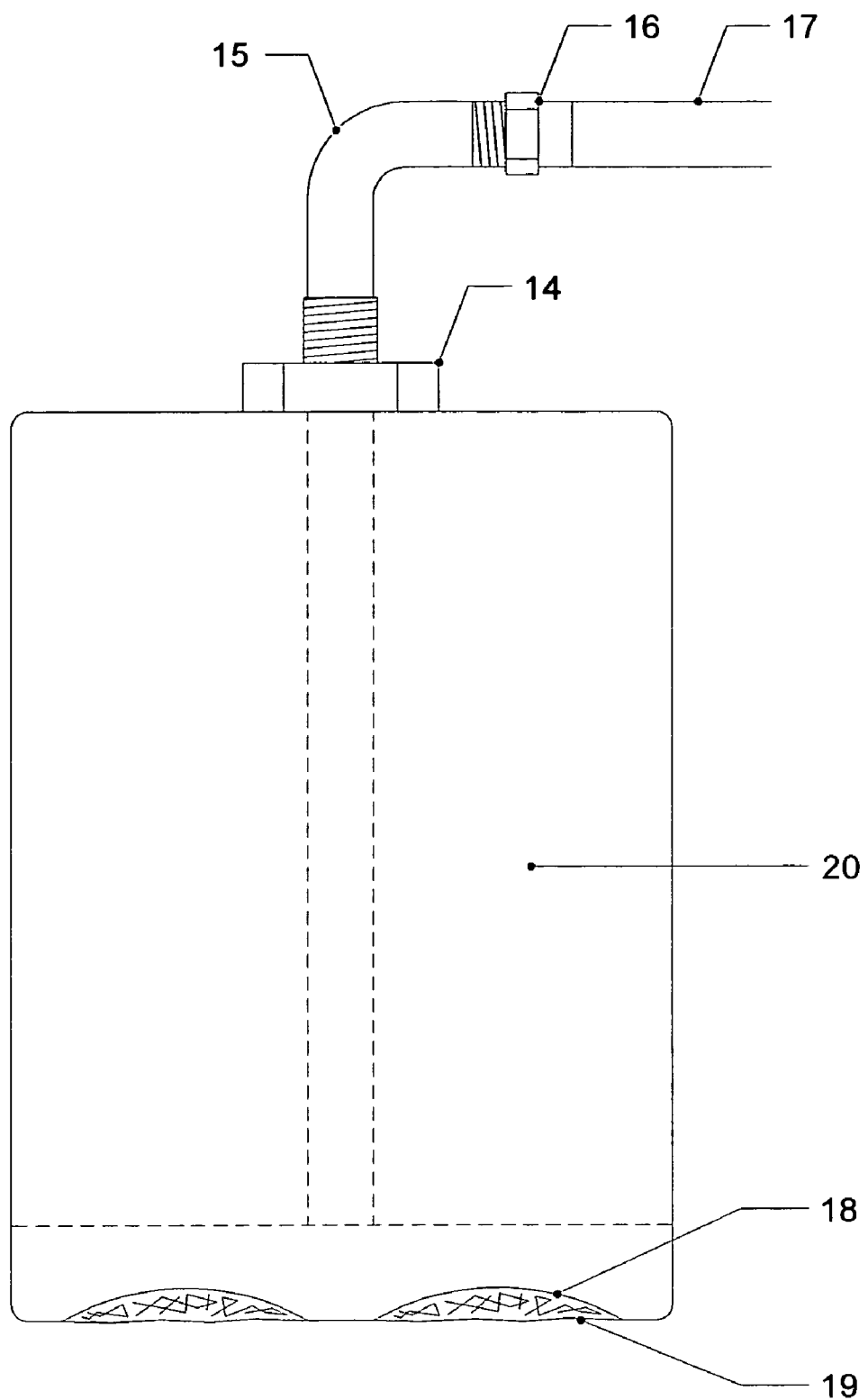
FIG. 4 shows a water filter which would have an open bottom with a pre-filter material and concave cutouts on the sides to let water in and an opening on the top for a fitting to connect to the tubing that goes up to the faucet.

FIG. 4 provides additional details on the water filter that would be located inside the container and be placed at the bottom. Air pressure in the top of the container would force water into the bottom of the water filter. The bottom of the water filter would be open. The cutouts on the side of the water filter 18 would allow water into the open bottom. There would be a spongy pre-filter material 19 of about one-half inch thick and the diameter of the water filter to filter out any obvious larger particles in the water. Water would go through the filter material inside the water filter. The filter material 20 could be activated carbon, ceramic, or felt that would be for the purpose of making potable water more desirable to drink.

The preferred filter material would be activated carbon. Once water went through the filter material it would go out the opening on top 14 through an elbow 15 and connect to tubing 17 with a tightening nut 16 and up to the faucet.

Figure 5:
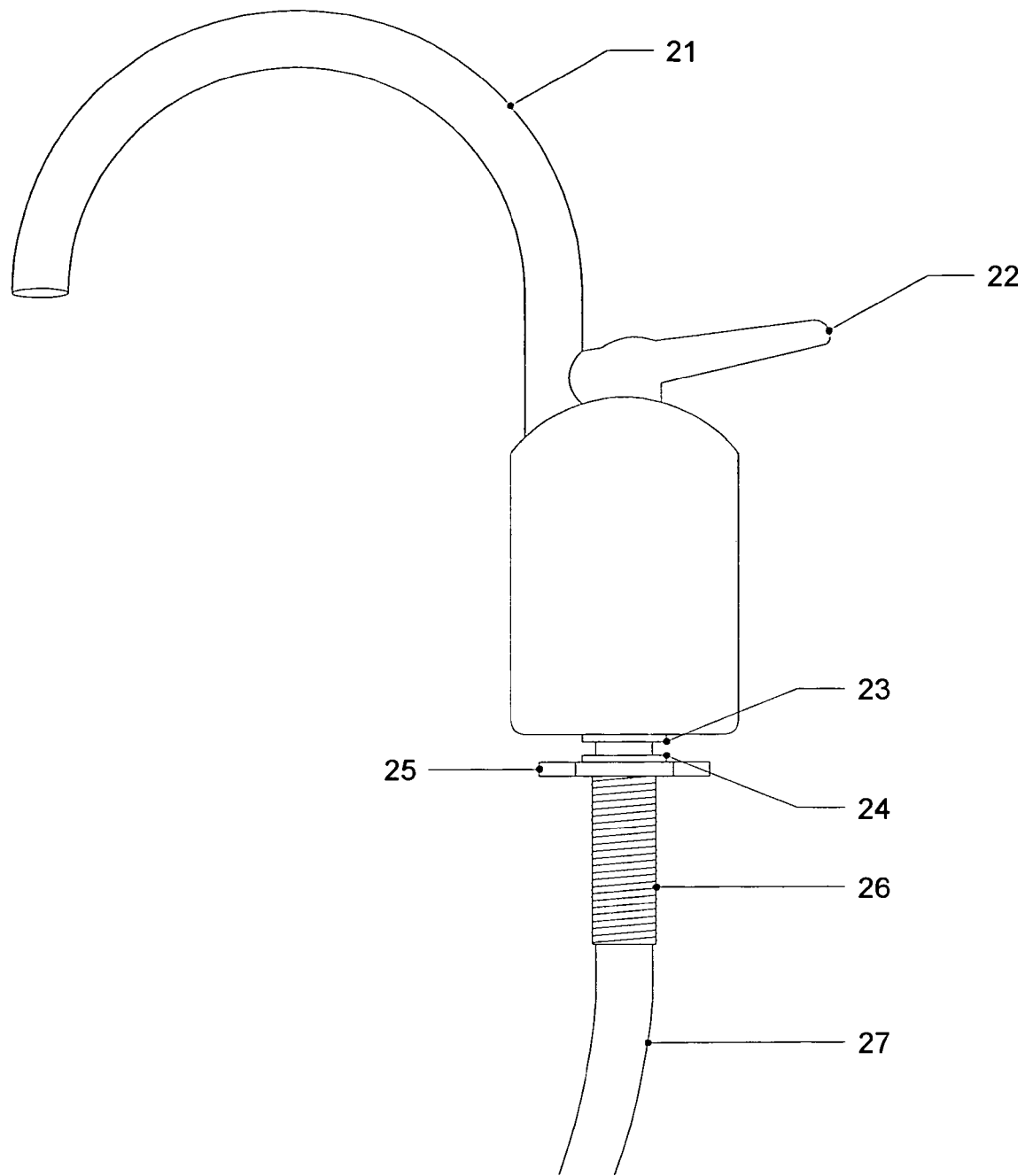
FIG. 5 shows a faucet with a spout and lever for dispensing filtered drinking water.

FIG. 5 provides additional details on the faucet that would be used to dispense the filtered drinking water. The faucet would have a washer 23 on the top of the cap of the container underneath the base of the faucet and a washer 24 on the inside of the cap where the faucet stem goes inside the cap of the container. The threads 26 on the stem of the faucet would have a nut 25 that would screw up and hold the faucet on the cap and make an air tight connection. The tubing 27 would go up into the faucet. Water would come out the spout 21 when the lever 22 was pushed down to dispense the water.

Conclusion, Ramifications, and Scope

The advantages is this invention are that it allows a person to have a portable filtered drinking water system wherever they may go that would provide the equivalent advantages that a system for home use has. These advantages are low cost, high volume, and convenience of filtered drinking water. Also if a person increases their body's level of hydration, they will have improved health. This could become especially important in the summer months or when a person is in a warmer climate. A person would be more likely to drink more water if it had improved taste and no longer had an unpleasant odor.

Although the description above contains many specifications, these should not be construed as limiting the scope of the invention but as merely providing illustrations of some of the presently preferred embodiments of this invention. Examples are as follows:

- the container could be of various shapes and have different features other than the handle;
- the hand air pump could be located in different positions, be of different sizes or create air pressure other than with a piston and flapper control;
- the water filter could be of different sizes and shapes, located in different positions, have a different way of passing water through the filter material, or have different types of filter material other than activated carbon, ceramic, or felt material; and
- the faucet could be located in a different position or be of a different type.

Thus the scope of the invention should be determined by the appended claims and their legal equivalents, rather than by the examples given.

I claim:

1. In a portable filtered drinking water system, a device comprising:
   a) a container configured to hold potable water;
   b) a container cap threaded onto the container;
   c) a hand air pump screwed into the container cap and configured to create air pressure in the container;
   d) a water filter comprising a cylinder having an open bottom and cutouts on the sides of the cylinder at the bottom that are configured to allow water to flow into the filter, a filter cap having a threaded hole configured to let water out of the filter, wherein the water filter is capable of filtering several hundred gallons of potable water to improve the quality of water for drinking that is placed inside the container;
   e) a pre-filter material covering the open bottom;
   f) a filter material inside the cylinder for the water to pass through;
   g) a faucet threadedly mounted into the container cap with washers and a nut in such a way as to have an air-tight seal and configured to dispense filtered water, the faucet comprising a spout configured to control a downward direction of water coming out of the faucet and a lever connected to the faucet configured to control the dispensing of water out of the faucet;
   h) a fitting threadedly connected to the threaded hole of the filter cap, the fitting connected to tubing going up to the faucet.

2. The container of claim 1 being large enough to hold 2 to 3 gallons of water but not limited to the maximum or minimum of this quantity.

3. The container of claim 1 being made of clear plastic material.

4. The container of claim 1 being capable of holding multiple compressions of air pressure.

5. The container of claim 1 having a handle molded into the outside of the container.

6. The container of claim 1 having a bracket molded inside the container to hold the water filter in place.

7. The water filter of claim 1 is a filter to improve the quality of potable water by removing undesirable tastes and odors and removing contaminants found in potable water to make it more desirable for drinking.

8. The hand air pump of claim 1 having a handle, piston rod, cylinder, and flapper valve that allow air to be forced into the container yet prevent air and water from coming back up into the cylinder of the hand air pump.

9. The hand air pump of claim 8 making an air-tight seal when screwed into the cap of the container.

10. The hand air pump of claim 8 is to create multiple compressions of air pressure in the container to force water through the water filter and out the faucet.

11. The hand air pump of claim 8 being made of plastic, rubber O rings and flapper valve.

* * * * *